US007024580B2

(12) United States Patent
Guimbellot et al.

(10) Patent No.: US 7,024,580 B2
(45) Date of Patent: Apr. 4, 2006

(54) MARKOV MODEL OF AVAILABILITY FOR CLUSTERED SYSTEMS

(75) Inventors: David Edward Guimbellot, Redmond, WA (US); John Morgan Oslake, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 630 days.

(21) Appl. No.: 10/295,286

(22) Filed: Nov. 15, 2002

(65) Prior Publication Data

US 2004/0153866 A1 Aug. 5, 2004

(51) Int. Cl.
*G06F 11/00* (2006.01)
(52) U.S. Cl. ............................................... 714/1; 714/4
(58) Field of Classification Search .................... 714/4, 714/43, 47, 1; 703/2; 709/224
See application file for complete search history.

(56) References Cited

U.S. PATENT DOCUMENTS

| 6,334,196 | B1 * | 12/2001 | Smorodinsky et al. | ......... 714/37 |
| 6,496,948 | B1 * | 12/2002 | Smorodinsky | ................ 714/37 |
| 6,763,321 | B1 * | 7/2004 | Gross et al. | ................. 702/186 |
| 2002/0077800 | A1 * | 6/2002 | Kampe | ........................ 703/21 |
| 2003/0079154 | A1 * | 4/2003 | Park et al. | ..................... 714/1 |
| 2003/0172150 | A1 * | 9/2003 | Kennedy | .................... 709/224 |

OTHER PUBLICATIONS

Cankaya, H.C., et al., "Improved survivability analysis for SONET SHRs," *Computer Networks*, 1999, 31, 2505-2528.

Lai, C.D., et al., "A model for availabilty analysis of distributed software/hardware systems," *Information and Software Technology*, 2002, 44, 343-350.

Rajgopal, J., et al., "Modular Operational Test Plans for Inferences on Software Reliability Based on a Markov Model," *IEEE Transactions on Software Engineering*, Apr. 2002, 28(4), 358-363.

Suliman, M., et al., "Markov Availability Models on Neural Networks," *Microelectronics and Reliability*, May 1992, 32 (5) 687-697.

Malhotra, M., "An Efficient Stiffness-Insensitive Method for Transient Analysis of Markov Availability Models," *IEEE Transactions on Reliability*, Sep. 1996, 45 (3), 426-428.

* cited by examiner

*Primary Examiner*—Dieu-Minh Le
(74) *Attorney, Agent, or Firm*—Woodcock Washburn LLP

(57) ABSTRACT

Availability of a clustered system is determined by identifying all possible states of a cluster, mapping the connections between the states are mapped and determining the probability of the cluster being in each of the states is determined. Availability of the cluster is the sum of the probabilities of being in those states in which the cluster is at least partially available. Parameters affecting the availability of the cluster include the rates at which a cluster transitions from state to state, including the reciprocal of Mean Time To Fail, Mean Time to Fail-Over, Mean Time To Fail-Back and Mean Time To Restore. Availability of statefull and stateless clusters may be determined. Availability of clusters including any number of nodes (e.g., a Internet service) can be determined. In one embodiment of the invention, a target availability is determined and parameters are varied to determine the most efficient approach to reach the target availability.

21 Claims, 10 Drawing Sheets

MARKOV MODEL OF AVAILABILITY FOR CLUSTERED SYSTEMS

FIELD OF THE INVENTION

This invention relates to the field of availability analysis and in particular to the field of calculating availability of clustered systems using mathematical modeling.

BACKGROUND

"Availability", as used in the world of computing, encompasses the concepts of system failures and recovery schemes and the impact of each on downtime and uptime. Availability is commonly quantified by the "number of nines", meaning the percentage of time that a given system is active and working. For example, "2 nines" means 99% availability, and "3 nines" means 99.9% availability. The following table demonstrates the maximum system downtime required to achieve the coveted increase in nines.

| Acceptable Uptime (%) | Per day | Per month | Per year |
| --- | --- | --- | --- |
| 95 | 72.00 minutes | 36 hours | 18.26 days |
| 99 | 14.40 minutes | 7 hours | 3.65 days |
| 99.9 | 86.40 seconds | 43 minutes | 8.77 hours |
| 99.99 | 8.64 seconds | 4 minutes | 52.60 minutes |
| 99.999 | 0.86 seconds | 26 seconds | 5.26 minutes |

As can be seen, to increase availability from "two nines" to "five nines" requires a decrease in system downtime from 14.40 minutes per day to only 0.86 seconds per day. Many customers require a certain level of system availability from their service providers and typically specify this level of availability in a Service Level Agreement (SLA). The SLA may also specify what percentage of the time services will be available, the number of users that can be served simultaneously, performance benchmarks to which actual performance are periodically compared and the like. Often, financial penalties are levied for failure to meet these contractual requirements, thus providing a considerable incentive to service providers to increase system availability. Correspondingly there is a need for service providers to be able to predict availability levels with a considerable degree of accuracy and robustness.

One way to improve availability is by the use of clustering. A cluster is a group of independent computers that work together to run a common set of applications or services but appear to the client and application to be a single system. Clustered computers are physically connected by cables and are programmatically connected by specialized software, enabling features (such as load balancing and fail-over) that increase availability.

Load balancing distributes server loads across all the servers in the system, preventing one server from being overworked and enabling capacity to increase with demand. Network load balancing complements clustering by supporting availability and scalability for front-end applications and services such as Internet or intranet sites, Web-based applications, media streams and terminal-emulating server-based computing platforms.

Fail-over automatically transfers resources from a failing or offline cluster server to a functioning one, thereby providing users with constant access to resources. For example, a MICROSOFT SQL SERVER or MICROSOFT EXCHANGE SERVER, among others, could be implemented as a clustered server.

Current analysis methods used for calculating system availability typically consume massive amounts of time and hardware resources and thus can be enormously expensive. One or more servers are typically set up in the deployment and tests that are supposed to simulate expected usage are run. Availability statistics are collected and metrics such as Mean Time To Fail (MTTF) are computed. Not only are these tests expensive to run, the test results themselves are suspect because the code designers fix the errors encountered in the tests. Thus the simulation does not reflect the real world, and estimations of availability based on the simulation lack credibility. Additionally, in the case of calculating availability of Microsoft clustered systems, no known method has been developed whereby the connections between the server elements can be clearly expressed. Hence, there is a need in the art to calculate availability of such clustered systems in a less costly, more accurate and more credible manner. It would also be helpful to be able to realistically estimate availability to the order of precision required by the "number of nines" promised.

SUMMARY OF THE INVENTION

A system and method for determining the availability of a clustered system or a group of clustered systems is described. To determine the availability of a clustered system, the state space of the system is approximated, the transitions between the states are mapped and the probability of the cluster being in each of the states is determined. Availability of the cluster is the sum of the probabilities of being in those states in which the cluster is available. Parameters affecting the availability of the cluster include the rates at which a cluster transitions from state to state. Using these metrics, availability of statefull and stateless clusters can be determined. Availability of clusters with any number of nodes can be determined. In one embodiment of the invention, a target availability is determined and parameters are varied to determine the most efficient approach to reach the target availability.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

A system and method for calculating the availability of a cluster of computing devices is described. Parameters including but not limited to Mean Time to Fail, Mean Time to Fail-Over, Mean Time to Repair or Recover and, in the context of active-active clusters, Mean Time to Fail-Back, are exposed as free parameters. The parameters are correlated through system state probabilities from which the availability (e.g., the number of nines) is calculated.

Exemplary Computing Environment

Figure 1A:
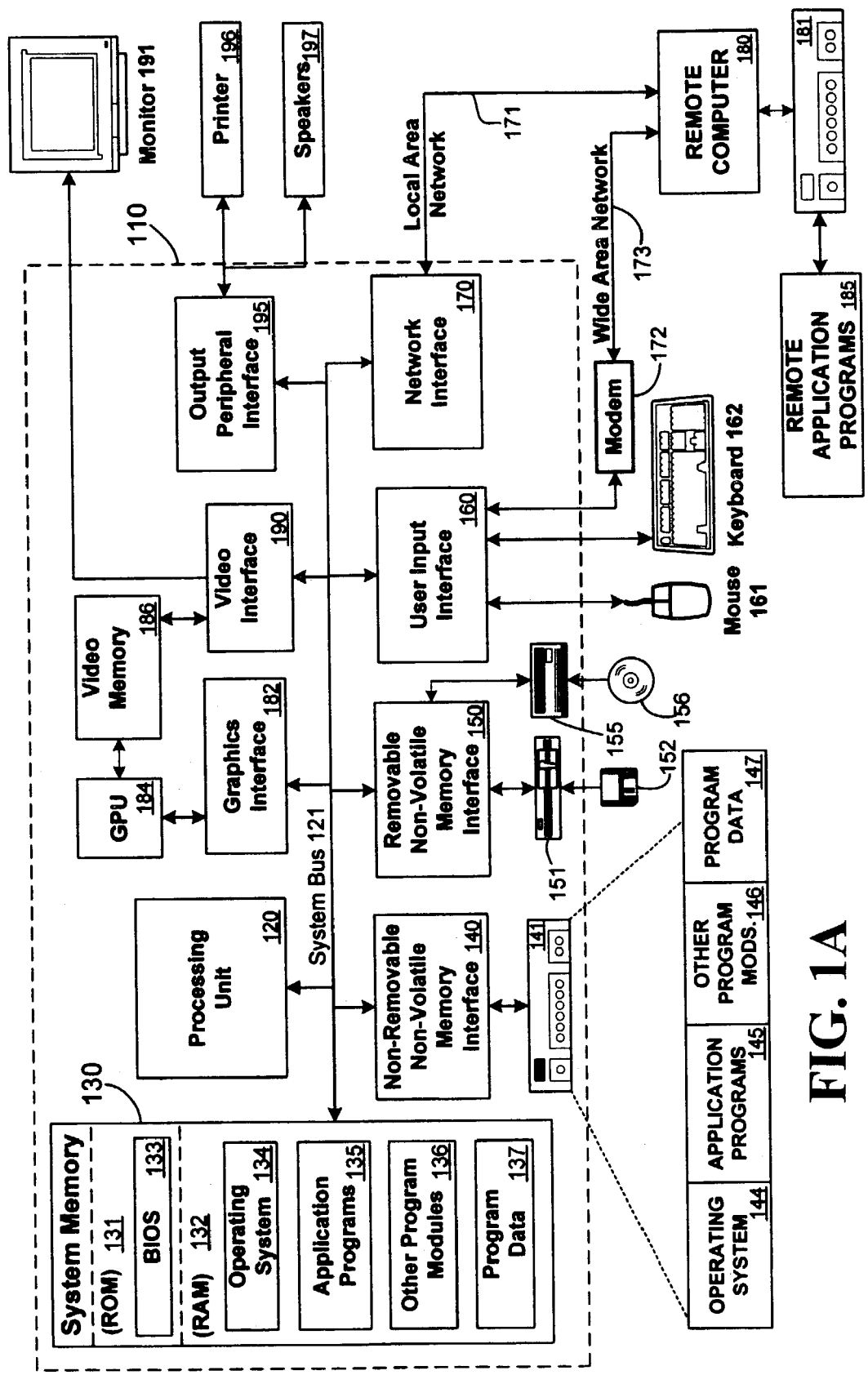
FIG. 1a is a block diagram of an exemplary computing environment in which aspects of the invention may be implemented.

FIG. 1a and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1a thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1a, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1a provide storage of computer readable instructions, data structures, program modules and other data for the computer 110. In FIG. 1a, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Calculating Availability of Clustered Computing Devices

Figure 1B:
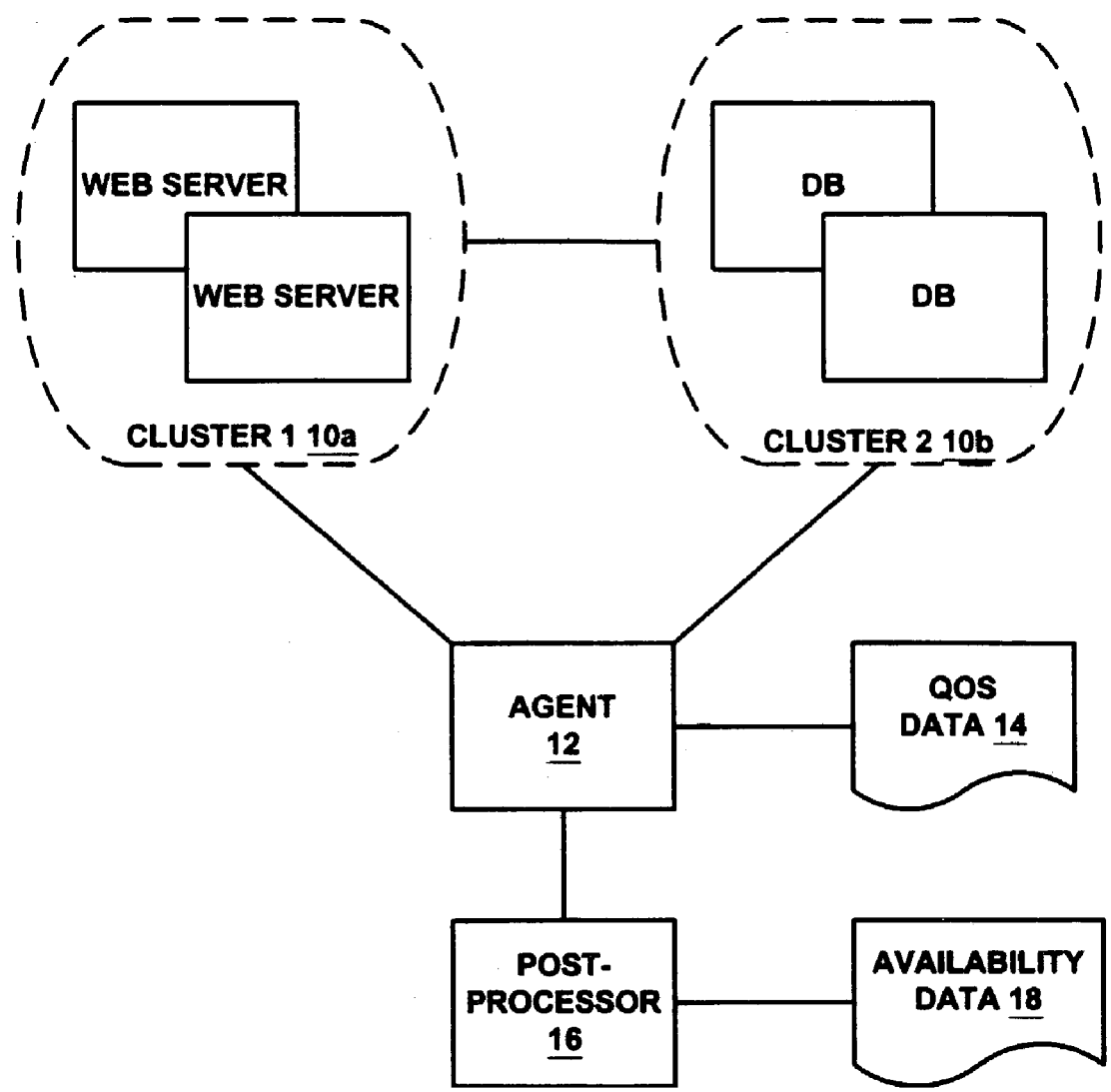
FIG. 1b is a block diagram of a system to determine availability of a cluster in accordance with one embodiment of the invention.

FIG. 1b is a block diagram of a system for determining availability of a cluster in accordance with one embodiment of the invention. Exemplary cluster one 10a comprises two web servers and cluster two 10b comprises two database servers. In one embodiment of the invention, clusters 10a and 10b are MICROSOFT WINDOWS clusters. Clusters 10a and 10b may exchange, for example, application data to fulfill service requests. Cluster one 10a and cluster two 10b are monitored by an agent 12. Agent 12 monitors clusters one 10a and two 10b in real-time and collects raw quality of service data 14 including time to fail (TTF), time to recover/ repair (TTR), time to fail-over (TTF/O) and time to fail-back (TTF/B). Over time, the data collected by the agent 12 generates a sequence of quality of service values for clusters one 10a and two 10b. When the monitoring time is sufficiently long, post-processing of the collected data 14 will generate statistically meaningful information. Collected data 14 may exist as a paper document, as a file, on disk, in memory, or in any suitable fashion.

Post-processor 16 consumes data 14 and performs calculations on the data 14 from which availability can be determined. In particular post-processor 16 calculates mean times such as Mean Time to Fail (MTTF), Mean Time to Fail-Over (MTTF/O), Mean Time to Fail-Back (MTTF/B), and Mean Time to Recover/Repair (MTTR) from which transition rates are calculated. The rates may be loaded into or associated with an internal representation of a Markov chain. The internal representation of the Markov chain in one embodiment of the invention is a directed graph, but any suitable internal representation is contemplated. The corresponding linear system is then solved for the cluster state probabilities and the state space enumeration is interpreted to map the probabilities into the cluster overall availability data 18.

The particular implementation and physical location of agent 12 and post-processor 16 depends on application context, data center considerations and other factors, thus agent 12 and post-processor 16 may reside on any suitable computing device. In one embodiment of the invention, post-processor 16 is a MICROSOFT EXCEL spreadsheet. In one embodiment of the invention times such as TTF, TTF/O, TTF/B and TTR are measured manually, such as with a stopwatch, and are recorded.

Alternatively, this data may be collected by an operating system feature or tool such as but not limited to MICROSOFT's Perfmon. Perfmon manages the collection of such data using perfmon counters. For example, an application may implement Perfmon counters to expose performance and reliability data such as the length of time the application has run without failure. Such a tool may be part of or reside on agent 12.

Figure 2:
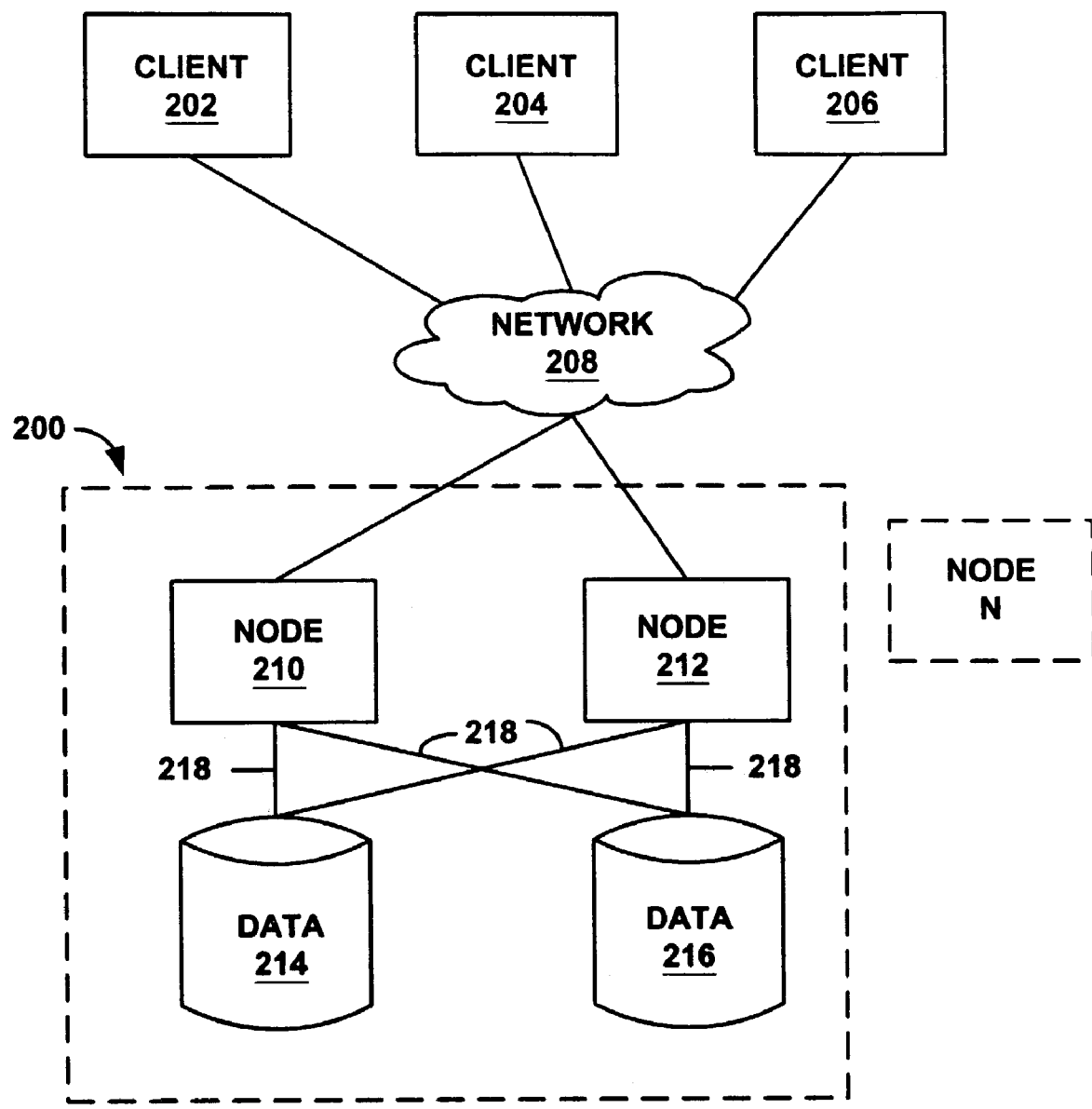
FIG. 2 is a block diagram of an exemplary two-node cluster for which availability may be calculated in accordance with one embodiment of the present invention.

FIG. 2 is a block diagram of a computing system including an exemplary two-node cluster 200 for which availability may be calculated in accordance with one embodiment of the present invention. Clients 202, 204, 206, etc. are in communication via logical connection 208 to cluster devices 210 and 212. The logical connection 208 depicted in FIG. 2 may be a local area network (LAN), a wide area network (WAN), or any other suitable network, such as those commonly encountered in offices, enterprise-wide computer networks, intranets and the Internet. Cluster devices 210, 212 may be connected to shared storage devices using SCSI, SCSI over Fiber Channel connections, or the like.

Cluster devices 210 and 212 may be individual servers, computers or other suitable computing devices running, for example, WINDOWS 2000 ADVANCED SERVER or WINDOWS NT SERVER 4.0 Enterprise Edition or other suitable operating system software, and are generally referred to as nodes. Nodes 210 and 212 may include at least one instance of a cluster service (not shown). "Cluster service" refers to a collection of components on a node that perform cluster-specific activities, such as detecting and responding to failures of nodes and the failure of resources the cluster service manages. "Resource", as used herein, typically refers to the hardware and software components within the cluster that are managed by the cluster service and would include components 210, 212, 214 and 216 in exemplary cluster 200 in FIG. 2. It will be understood that while FIG. 2 depicts a cluster of two nodes, the system and method described herein for calculating availability is equally applicable to clusters containing more than two nodes, such as for example, but not limited to, the four-node clusters supported by the WINDOWS 2000 DATACENTER SERVER.

The instrumentation mechanism provided by the cluster service for managing resources typically is the resource dynamically linked libraries (DLLs), which define resource abstractions, communication interfaces, and management operations although other suitable instrumentation mechanisms may be employed. Clustered systems such as the one depicted in FIG. 2 typically provide fail-over support for back-end applications including database, file server, enterprise resource planning, messaging systems and the like.

Clustered systems typically provide improved availability by enabling services and applications in the server cluster to continue to provide service during hardware or software component failure or during planned maintenance. Clustering also provides increased scalability by supporting servers that can be expanded with the addition of multiple processors (e.g., up to eight processors in WINDOWS 2000 ADVANCED SERVER and up to 32 processors in WINDOWS 2000 DATACENTER SERVER) and additional memory (up to a maximum of 8 gigabytes (GB) of random access memory (RAM) in WINDOWS 2000 ADVANCED SERVER and 32 GB in WINDOWS 2000 DATACENTER SERVER). Clustering also typically improves manageability by enabling administrators to manage devices and resources within the entire cluster as if managing a single computer.

The collection of several server computers into a single unified cluster enables the sharing of a computing load to be transparent to clients 202, 204, 206, etc., who need not know that more than one server is involved. For example, if any resource (e.g., node 210) in the server cluster 200 fails, cluster 200 can continue to offer service to clients 202, 204, 205, etc. using a resource on one of the other servers (e.g., 212) in the cluster 200, regardless of whether the failed component is a hardware or software resource. In other words, when a resource fails, typically clients 202, 204, 206, etc. connected to cluster 200 may experience temporarily degraded performance, but do not completely lose access to the service. Additionally, as more processing power is needed, new resources can be added while cluster 200 remains online and available to clients 202, 204, 206, etc.

A resource is online when it is available and providing service to the cluster 200. Resources typically are physical or logical entities that can be brought online and taken offline; can be managed in a server cluster; and can be owned by only one node (e.g., node 210 or 212) at a time. Cluster resources include physical hardware devices such as disk drives and network cards, and logical items such as Internet Protocol (IP) addresses, applications, and application databases. Each node 210, 212 in the cluster 200 typically has its own local resources. Additionally, however, cluster 200 may also have common resources, such as a common data storage array and private cluster network (not shown). These common resources typically are accessible by each node in the cluster. One special common resource (not shown) is the quorum resource, a physical disk in the common cluster disk array that plays a critical role in cluster operations. It typically must be present for node operations—such as forming or joining a cluster—to occur.

A resource group is a collection of resources managed by the cluster service as a single, logical unit. Application resources and cluster entities can be easily managed by grouping logically related resources into a resource group. When a cluster service operation is performed on a resource group, the operation affects all individual resources contained within the group. Typically, a resource group is created to contain all the elements needed by a specific application server and client for successful use of the application.

The cluster service typically is based on a shared-nothing model of cluster architecture. This model refers to how servers in a cluster 200 manage and use local and common cluster devices and resources. In the shared-nothing cluster, each server owns and manages its local devices. Devices common to the cluster, such as a common disk array and connection media, are selectively owned and managed by a single server (e.g., node 210, 212) at any given time.

The shared-nothing model typically simplifies the task of managing disk devices and standard applications. This model generally does not require any special cabling or applications and enables cluster service to support standard operating systems including, but not limited to, MICROSOFT WINDOWS 2000 and MICROSOFT WINDOWS NT-based applications and disk resources.

The cluster service typically uses standard server drivers including but not limited to MICROSOFT WINDOWS 2000 and MICROSOFT WINDOWS NT server drivers for local storage devices and media connections. The cluster service may support several connection media for external common devices that typically need to be accessible by all servers in the cluster 200. External storage devices (e.g., storage 214, 216) that are common to the cluster may require small computer system interface (SCSI) devices and may support standard PCI-based SCSI connections as well as SCSI over fiber channel and SCSI bus with multiple initiators. Fiber connections may be SCSI devices hosted on a fiber channel bus instead of a SCSI bus. Conceptually, fiber channel technology encapsulates SCSI commands within the fiber channel and makes it possible to use the SCSI commands the cluster service is designed to support. These SCSI commands may be Reserve/Release and Bus Reset and may function the same over standard or non-fiber SCSI interconnect media.

Within the cluster 200, fail-over can occur automatically because of an unplanned hardware or application failure, or can be triggered manually. When a node (e.g., node 210) in a cluster 200 fails, its resource groups are transitioned to one or more available servers (e.g., node 212) in the cluster. Fail-over can be planned, or automatic. Automatic fail-over is similar to planned administrative reassignment of resource ownership but requires determining what groups were running on the failed node and which nodes should take ownership of the various resource groups. All nodes (e.g., nodes 210, 212) in the cluster 200 that are capable of hosting the resource groups may negotiate among themselves for ownership. This negotiation is based on node capabilities, current load, application feedback, or a node preference list. The node preference list is part of the resource group properties and is used to assign a resource group to a node. Once negotiation of the resource group is complete, all nodes in the cluster update their databases and keep track of which node owns the resource group.

In clusters with more than two nodes, the node preference list for each resource group can specify a preferred server plus one or more prioritized alternatives. This enables cascading fail-over, in which a resource group may survive multiple server failures, each time cascading or failing over to the next server on its node preference list. Cluster administrators typically can set up different node preference lists for each resource group on a server so that, in the event of a server failure, the groups are distributed amongst the cluster's surviving servers.

An alternative to this scheme, commonly called N+1 fail-over, sets the node preference lists of all cluster groups. The node preference list identifies the standby cluster nodes to which resources should be transitioned during first fail-over. The standby nodes are servers in the cluster that are mostly idle or whose own workload can be easily preempted in the event a failed server's workload must be transitioned to the standby node.

When a node comes back online, some resource groups can be transitioned back to the recovered node. This is referred to as fail-back. The properties of a resource group must have a preferred owner defined in order to fail-back to a recovered or restarted node. Resource groups for which the recovered or restarted node is the preferred owner will be transitioned from the current owner to the recovered or restarted node. The cluster service typically provides protection against fail-back of resource groups at peak processing times, or to nodes that have not been correctly recovered or restarted. Fail-back properties of a resource group may include the hours of the day during which fail-back is allowed, plus a limit on the number of times fail-back is attempted.

Typically, each node 210, 212 in the cluster 200 periodically queries its resources using resource libraries (DLLs) in order to detect a resource failure, such as, for example, an access violation. Query polling intervals may be controlled by settable properties. If a resource failure is detected, (e.g., node 210 goes down) cluster service (e.g., the instance of the cluster service running on node 212) typically can be configured to respond with restart and/or automatic fail-over procedures. A local restart procedure refers to restarting the failed resource and its dependencies on the current node (e.g., node 210), and automatic fail-over refers to pushing and restarting the resource group which contains the failed resource on an alternate node (e.g., node 212).

If the cluster service is configured to restart a failed resource, it will continue to do so until successful, or until the maximum number of restarts is exceeded (the maximum number of restarts may be a settable property) within the specified period of time (which may also be a settable property). If restarting is not successful, then fail-over may be attempted, or restarting may be attempted again after remaining in the failed state for a set period of time (which may also be controlled by a settable property).

During fail-over, the cluster service may first attempt to gracefully offline each resource in the resource group containing the failed resource within a specified period of time (which may be controlled by a settable property). If this timeout is exceeded, then the resource is forcefully terminated. Once the resource group is offline, an attempt may be made to transfer it to a preferred host node. If the transfer is successful, attempts may be made to bring the resource group back online on the new host node. The cluster service may continue attempting fail-over until successful, or until the specified number of attempts is exceeded (which may be controlled by a settable property) within the specified period of time (which may be controlled by a settable property).

In addition to local detection of resource failures, all nodes 210, 212 in a cluster 200 may periodically exchange messages to communicate status. If any node does not receive a message (e.g., a heartbeat) from any other node after consecutive communication attempts, then a regroup algorithm may be initiated to determine current cluster membership. Typical causes of missed heartbeats include failure of the machine, its network interface, or the underlying network infrastructure. After completion of this regroup event, the remaining online nodes engage in ownership arbitration to determine new owners for the resource groups owned by the failed node. These resource groups are then pulled by selected nodes, and their resources are restarted and marked as online. This procedure of pulling resource groups and restarting resources is referred to as automatic fail-over.

Resource groups may also be manually brought offline, pushed, and restarted on other online nodes as part of planned reassignment for maintenance or other reasons. This procedure is referred to as manual fail-over.

After a preferred node is repaired, those resource groups formerly under its ownership may be transitioned back and restarted under the preferred node again. The particular timing of this automatic fail-back procedure may be configurable, and may occur immediately after repair of the preferred node or between time windows as controlled by settable properties.

There are two types of clustering: active-passive clustering and active-active clustering. With active-passive 2-node clustering, the active node serves requests while the passive node remains ready in standby mode. If the active node fails, then fail-over to the passive node is initiated. All requests continue to be directed to the failed node until fail-over is complete.

Figure 3A:
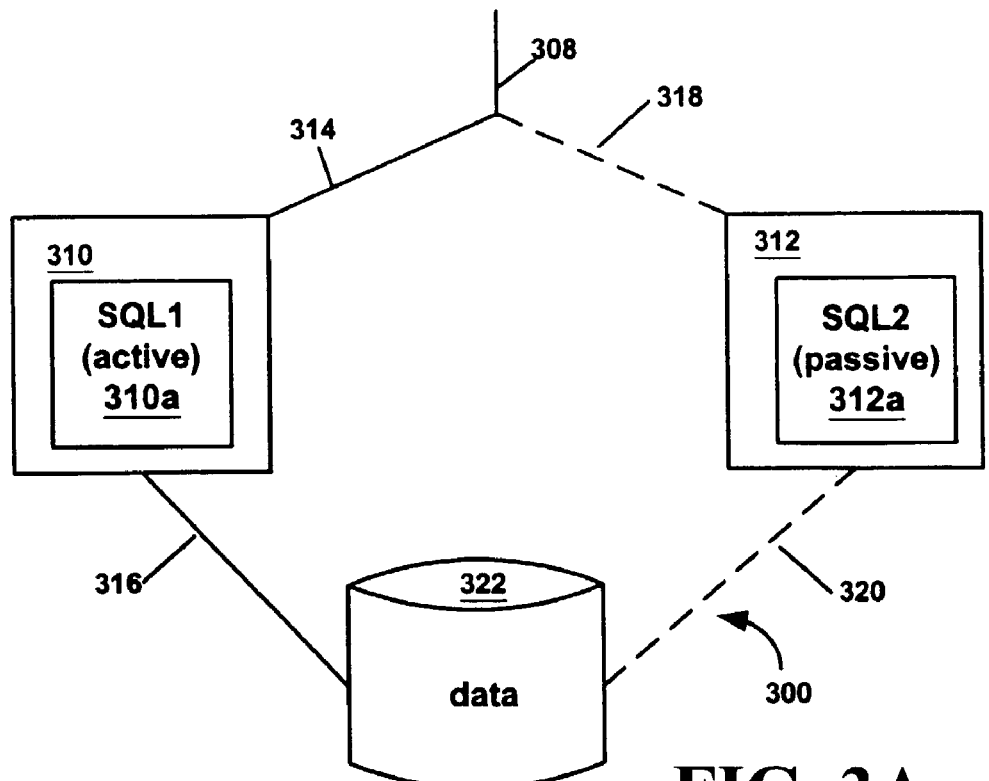
FIG. 3a is a block diagram of one state of an exemplary two-node active-passive cluster for which availability may be calculated in accordance with one embodiment of the present invention.

FIG. 3a is a block diagram of one state of an exemplary 2-node active-passive cluster 300 running the exemplary application SQL Server. It will be understood that while SQL Server is used in the example as the application running on the cluster, the invention is not so limited. Any suitable application may be running on the cluster. In FIG. 3a, node 310 is an active node, and node 312 is a passive node. Node 310 has an active instance of the application (SQL1 310a) serving requests on it, while node 312's instance of SQL server (SQL2 312a) is not serving requests. Solid lines 314 and 316 represent active connections whereby processing requests from connection 308 are received. Dotted lines 318 and 320 represent inactive connections. Node 310 and node 312 are connected to data resource 322 via active connection 316 and inactive connection 320 respectively. Active node 310 owns data resource 322.

Figure 3B:
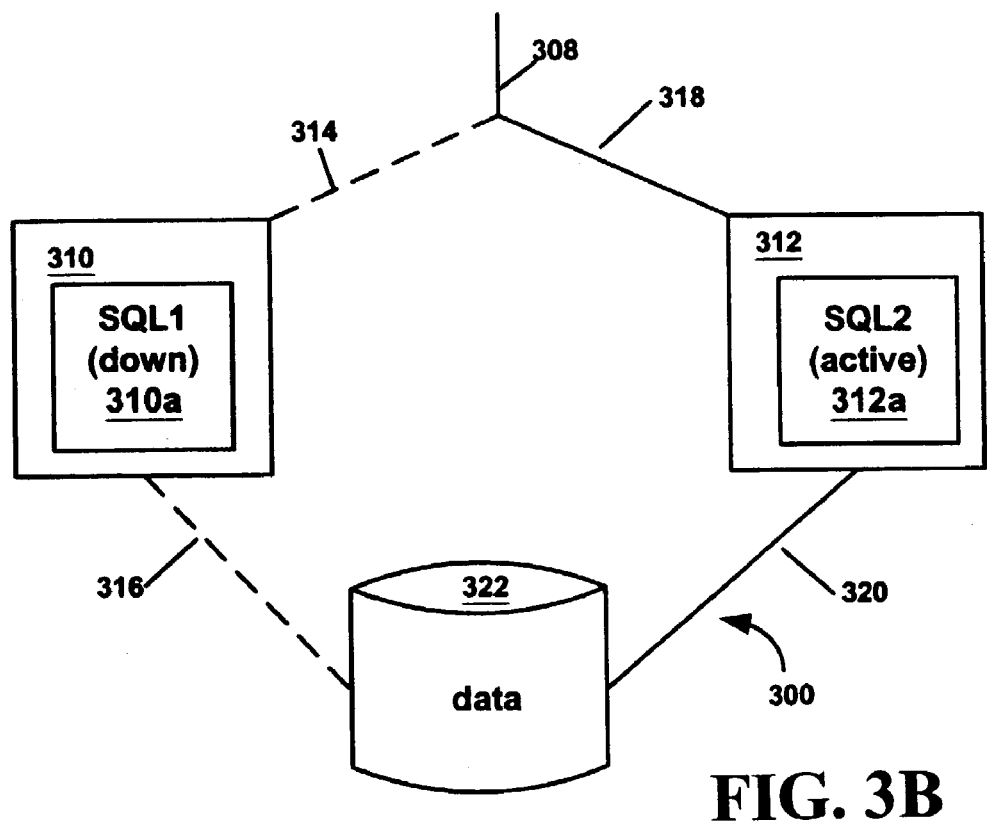
FIG. 3b is a block diagram of another state of an exemplary two-node active-passive cluster for which availability may be calculated in accordance with one embodiment of the present invention.

If node 310 fails or is taken offline, (i.e., is down), automatic or manual fail-over may result. During fail-over, SQL2 312a on node 312 becomes active, connections 318 and 320 become active, connections 314 and 316 become inactive and ownership of data resource 322 is transferred from node 310 to node 312, as shown in FIG. 3b. Until fail-over is complete, requests requiring resources from Data Resource 322 will fail.

Figure 4A:
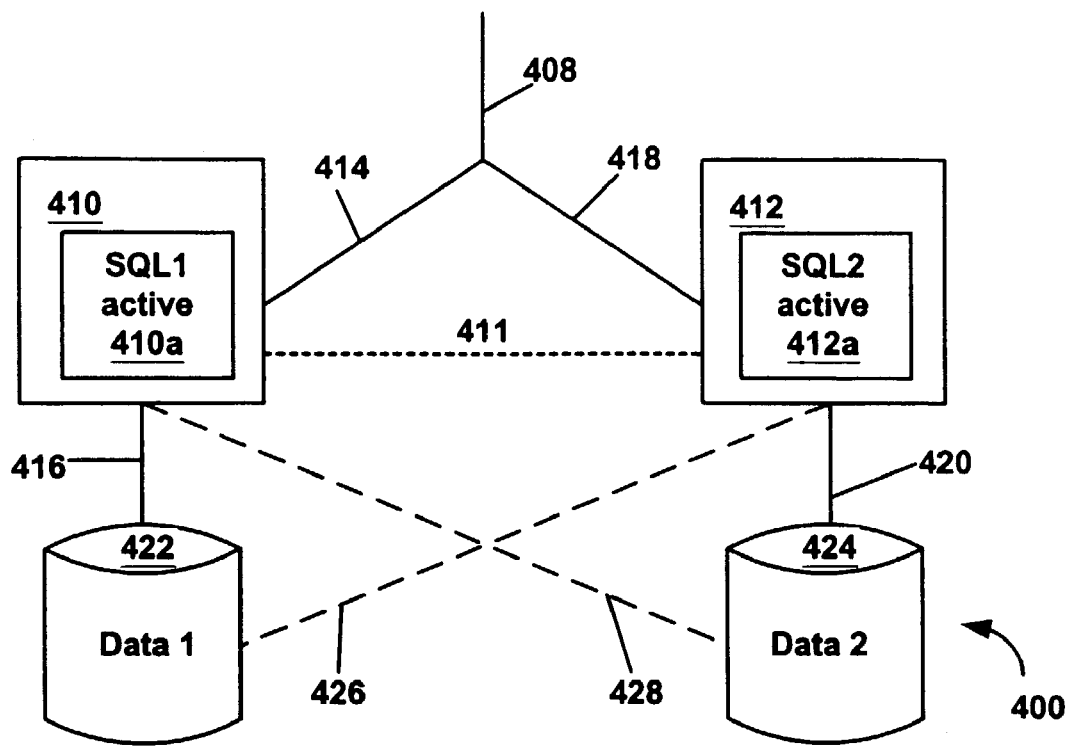
FIG. 4a is a block diagram of one state of an exemplary two-node active-active cluster for which availability may be calculated in accordance with one embodiment of the present invention.

FIG. 4a is a block diagram of one state of an exemplary 2-node active-active cluster 400 running the exemplary application SQL Server on them. In FIG. 4a, nodes 410 and 412 are active nodes (e.g., serve requests) and do not share resources. If, for example, either node 410 or 412 fails, then fail-over to the remaining online node is initiated. Node 410 has an active instance of the application SQL1 410a running on it and node 412 has an active instance of the application SQL2 412a running on it. Solid lines 414, 416, 418 and 420 represent active connections whereby processing requests from connection 408 are received, and passed to either 410a or 412a. Node 410 owns Data Resource 1 422 and is connected to Data Resource 1 422 via connection 416. Node 412 is connected to Data Resource 2 424 via active connection 420. Connections 426 and 428 between node 410 and Data Resource 2 424 and between node 412 and Data Resource 1 422 exist but are inactive.

Cluster 400 may detect a node failure of either node 410 or node 412 through message communication via connection 411. If SQL1 410a fails or is taken offline, automatic or manual fail-over from SQL1 410a to SQL2 412a may result. If SQL1 410a fails, until fail-over to SQL2 412a is complete, requests requiring resources from Data Resource 1 422 will fail. If SQL1 412a fails or is taken offline, automatic or manual fail-over from SQL2 412a to SQL1 410a may result. Until fail-over is complete, requests requiring resources from Data Resource 2 424 will fail.

Figure 4B:
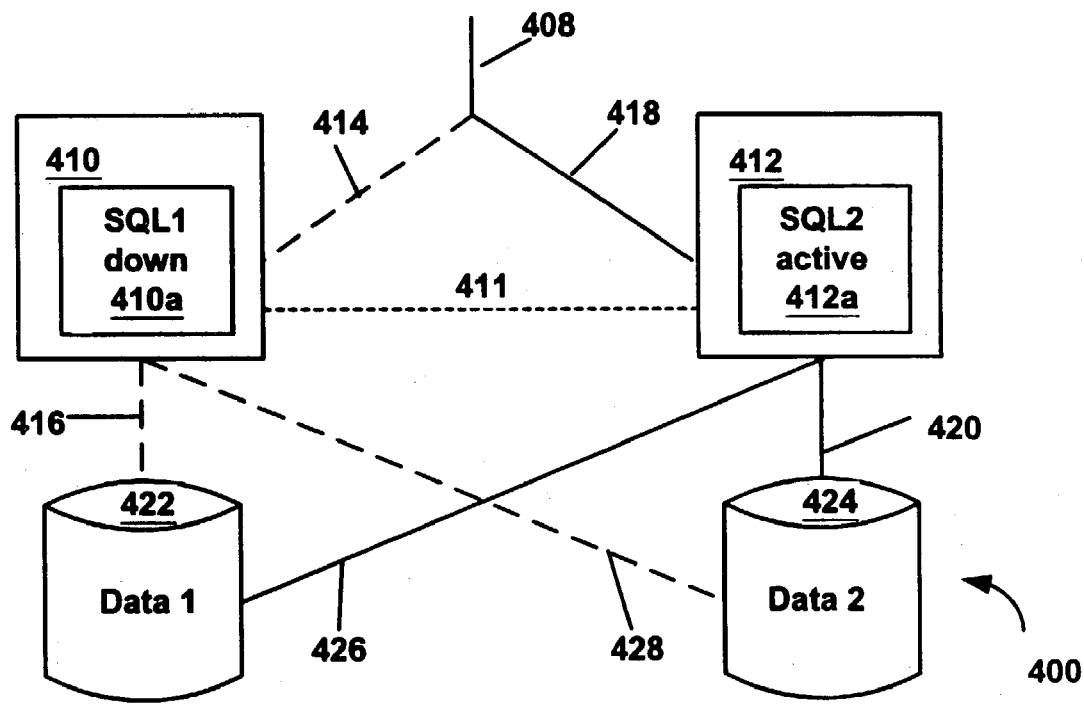
FIG. 4b is a block diagram of another state of an exemplary two-node active-active cluster for which availability may be calculated in accordance with one embodiment of the present invention.

Referring now to FIG. 4b, during the fail-over procedure from SQL1 410a to SQL2 412a, connection 426 becomes active and connection 416 becomes inactive, so that requests requiring resources from Data Resource 1 422 are satisfied by SQL2 412a via connection 426. Ownership of Data Resource 1 422 is transferred from node 410 to node 412.

Figure 4C:
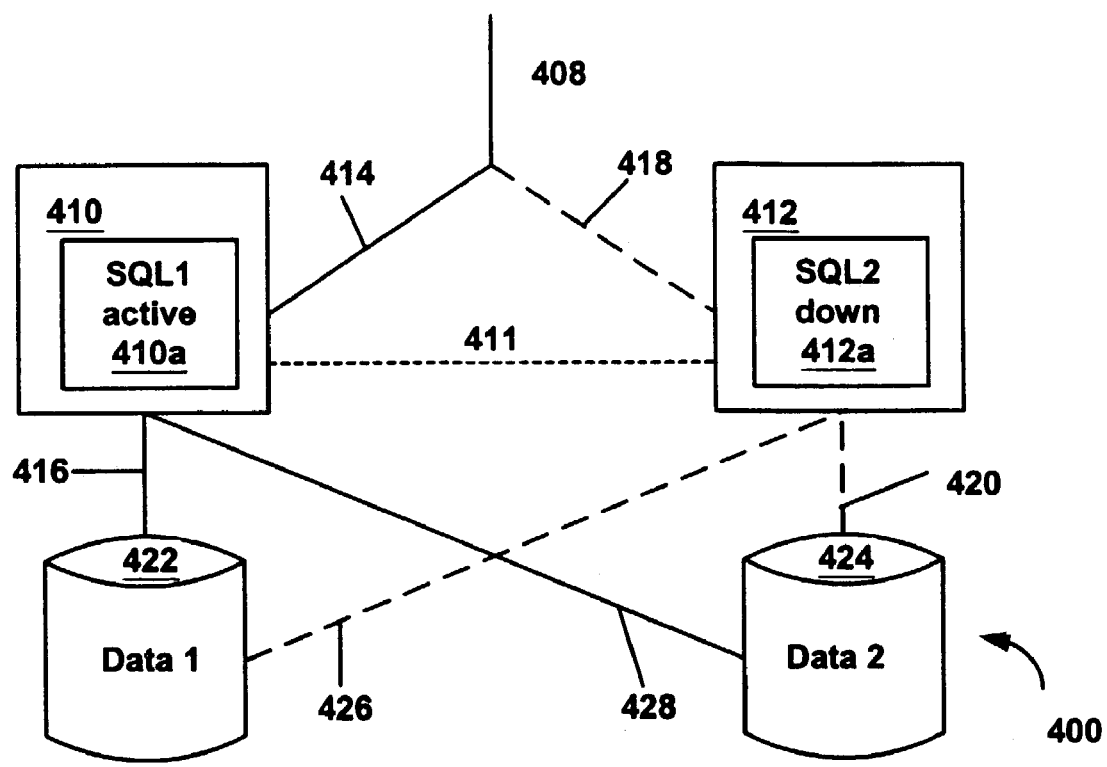
FIG. 4c is a block diagram of third state of an exemplary two-node active-active cluster for which availability may be calculated in accordance with one embodiment of the present invention.

Similarly, as shown in FIG. 4c, if, for example, node 412 fails, during the fail-over process from 412a to 410a, connection 428 becomes active and connection 420 becomes inactive so that requests requiring resources from Data Resource 2 424 are satisfied by SQL1 410a via connection 428. Ownership of Data Resource 2 424 is transferred from node 412 to node 410, as shown in FIG. 4c.

Figure 5:
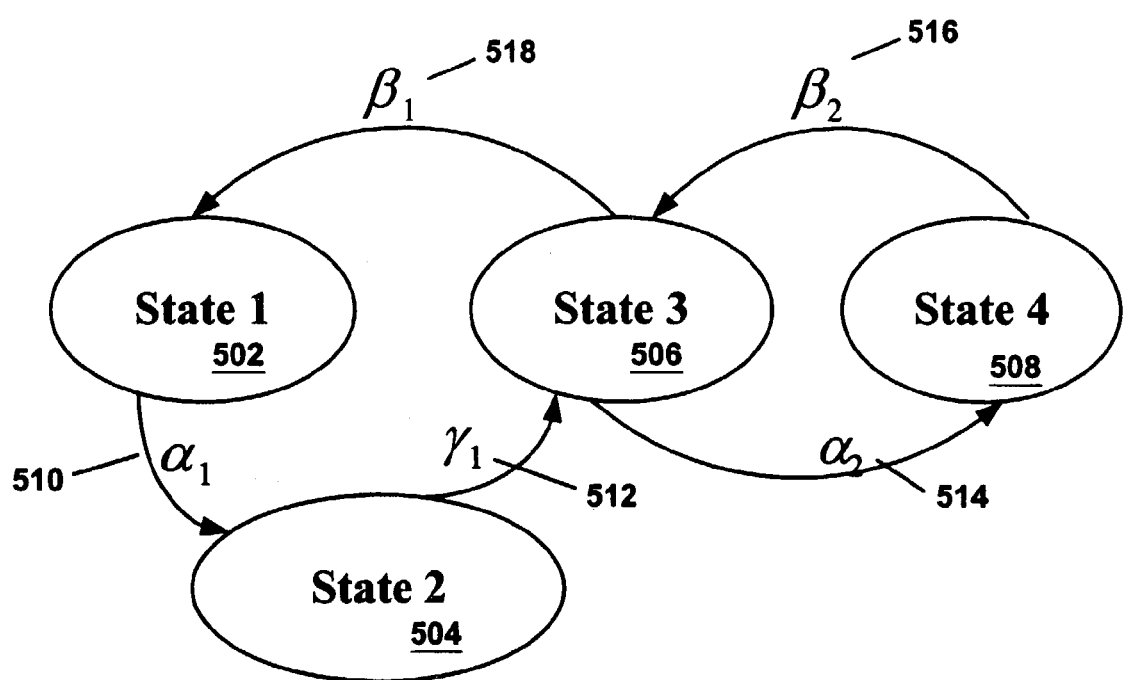
FIG. 5 is a Markov chain of the exemplary two-node active-passive cluster of FIGS. 3a and 3b.
Figure 7:
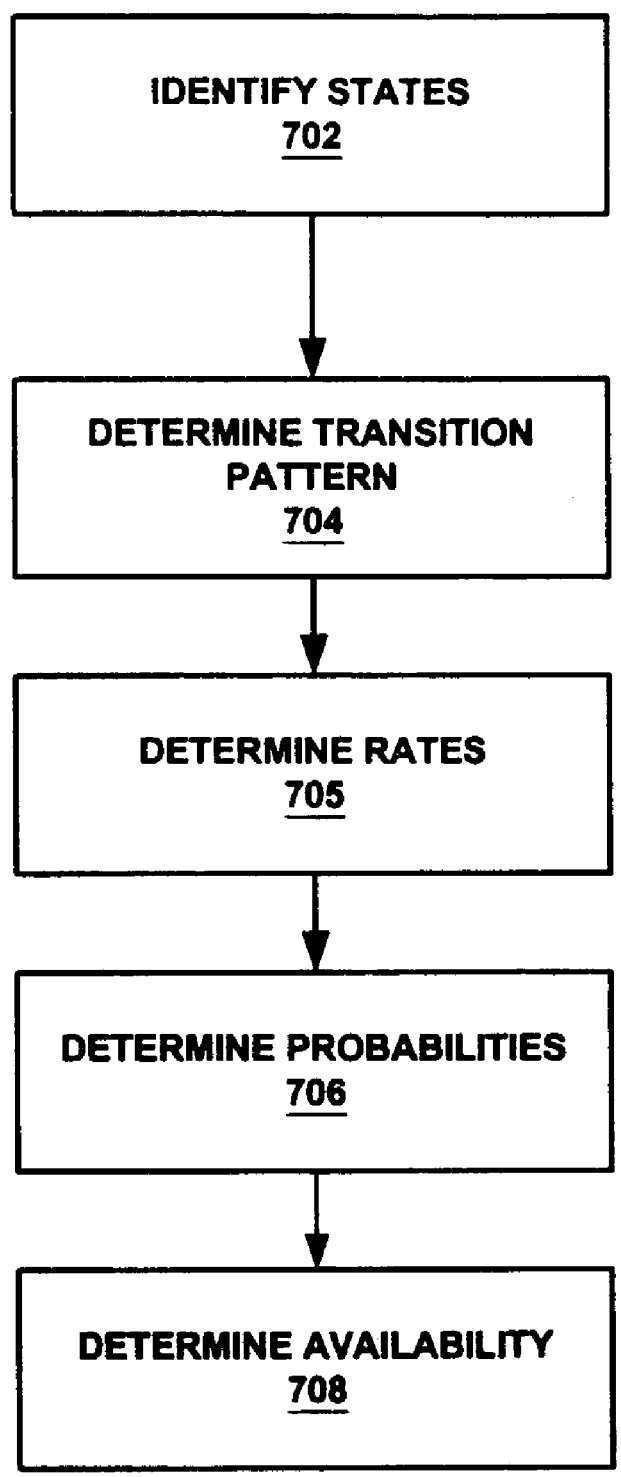
FIG. 7 is a flow diagram of a method of calculating availability of a cluster using Markov chains.

Referring now to FIGS. 3a, 3b, 5 and 7, availability is determined in accordance with one embodiment of the invention for an active-passive cluster such as the one described above. FIG. 5 is an illustration of a Markov chain for cluster 300. FIG. 7 is a flow diagram of a method of calculating availability of a clustered system using Markov analysis.

To calculate availability of a cluster, at step 702 all the possible states of the cluster are identified. Thus to calculate the availability of cluster 300 of FIGS. 3a and 3b, all possible states of the cluster 300 are enumerated. There are four possible states of cluster 300. The four possible states of active-passive cluster 300 are; state one: one node is active, (e.g., serving customers) and the other node is in a passive state, waiting for the first node to fail, so the cluster is 100% available; state two: the first node has failed and the passive node has not yet become active (transfer of control has not yet completed) so no customers are being served (0% availability); state three: transfer of control is complete and the second node is actively serving customers so the cluster is 100% available; and state four: before the first node is repaired and while the second node is active, the second node also fails so that no customers can be served (0% availability).

At step 704, the state space transition pattern is determined. In this step, the structure of the transitions between states (e.g., the edges in a directed graph) is determined. At step 705 the transition rates between states are determined (e.g., the weight of each edge in the directed graph). In one embodiment of the invention, this is done by Markov analysis and may be implemented internally as a directed graph. FIG. 5 illustrates a Markov chain for active-passive cluster 300. It should be understood that while the Markov chain depicted in FIG. 5 illustrates the state space transition pattern and the transition rates between states, the actual generation of such a figure is not required by the invention. Only an appreciation of the state space transition pattern and transition rates between states is required. For example, if a directed graph is used as a geometric representation of a Markov chain, the structure of the transitions between states may be represented by the edges in the directed graph and the transition rates between states may be represented by the weight of each edge in the directed graph.

In state 1 502 (active-passive state), node 1 310 and node 2 312 are up and the cluster 300 is available (i.e., active, for example, answering requests). In state 2 504 (fail-over in progress), node 1 310 has failed or has been taken offline (i.e., is down), node 2 312 is up (still in passive mode) and cluster 300 is not available. In state 3 506 (active down state), node 1 310 is still down, node 2 312 is up and active, and cluster 300 is available. In state 4 508 (catastrophic failure state), both nodes 310 and 312 are down and the cluster 300 is not available.

The mean rate at which the system transitions from state 1 to state 2 is the mean rate at which node one fails (e.g., the mean rate of failure of node one may be, for example, one failure per one year) and is represented in FIG. 5 as $\alpha_1$ 510. The mean time it takes for node one to fail (mean time to failure while in active-passive state) is the reciprocal of the mean rate of failure of node one or $1/\alpha_1$ and is called the Mean Time To Fail (MTTF) for node 1.

The mean rate at which the system transitions from state 2 to state 3 is the rate at which the fail-over process proceeds and is represented in FIG. 5 as $\gamma_1$ 512. The mean time it takes for the fail-over process to complete (mean time to fail-over to active-down state) is the reciprocal of the mean rate of fail-over from node 1 to node 2 or $1/\gamma_1$ and is called the Mean Time to Fail-Over (MTTF/O) from node 1 to node 2.

The mean rate at which the system transitions from state 3 to state 4 is the mean rate at which node two fails and is represented in FIG. 5 as $\alpha_2$ 514. The mean time it takes for node two to fail (mean time to failure while in active-down state) is the reciprocal of the mean rate at which node two fails or $1/\alpha_2$ and is called the Mean Time to Fail (MTTF) for node 2.

The mean rate at which the system transitions from state 4 back to state 3 is the mean rate of repair of node 2 and is represented in FIG. 5 as $\beta_2$ 516. The mean time it takes to repair node two (mean time to recover from catastrophic failure to active-down state) is the reciprocal of the mean rate of repair of node 2 or $1/\beta_2$ and is called the Mean Time to Repair or Restore (MTTR) for node 2.

Finally, the mean rate at which the system transitions from state 3 to state 1 is the mean rate of repair of node 1 and is represented in FIG. 5 as $\beta_1$ 518. The mean time it takes to repair node one (mean time to recover from active-down to active-passive state) is the reciprocal of the mean rate of repair of node 1 or $1/\beta_1$ and is called the Mean Time to Repair or Restore (MTTR) for node 1.

In one embodiment of the invention, it is assumed that simultaneous failure of both active and passive nodes 310 and 312 occurs with negligible probability, there is a negligible probability of failure of passive node 312 while node 310 is active and there is a negligible probability that node 312 will fail during fail-over. It is furthermore assumed that repair of failed node 310 is not attempted until fail-over to passive node 312 has occurred and that the failed node 310 occurs without interruption in service. Finally it is assumed that nodes 310 and 312 are symmetric, i.e., node 312 continues to serve until node 312 fails.

Figure 6:
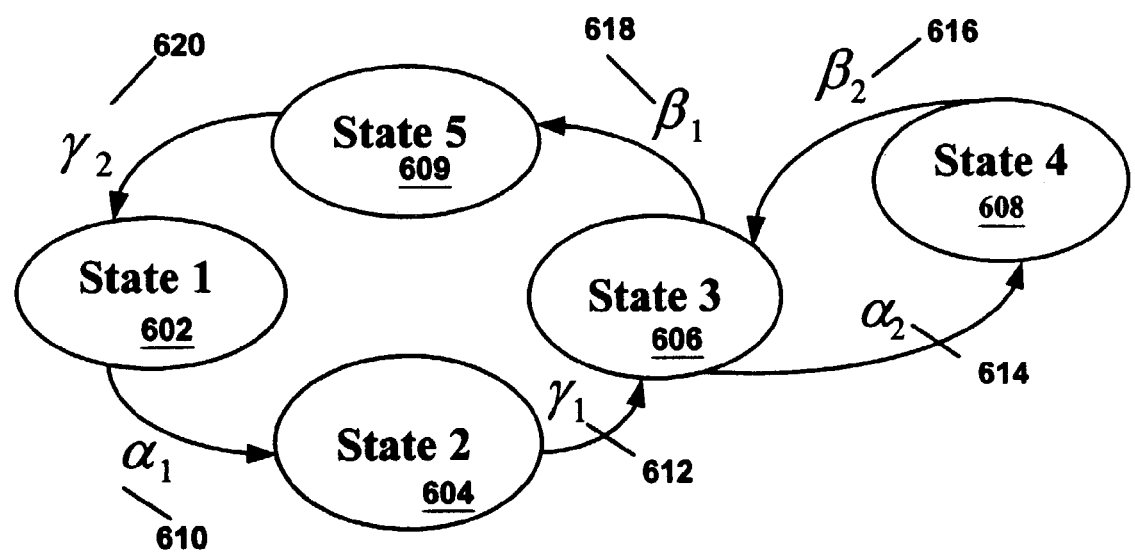
FIG. 6 is a Markov chain of the exemplary two-node active-active cluster of FIGS. 4a and 4b.

Referring now to FIGS. 4*a*, 4*b*, 4*c*, 6 and 7, availability is calculated in accordance with one embodiment of the invention for an active-active cluster such as the one described above. FIG. 6 is an illustration of a Markov chain of cluster 400. FIG. 7 is a flow diagram of a method of calculating availability of a clustered system using Markov chains.

To calculate availability of the 2-node active-active cluster 400, at step 702 all the possible states of cluster 400 are identified. Hence, to calculate availability for cluster 400 of FIGS. 4*a*, 4*b* and 4*c*, all possible states of the cluster 400 are enumerated. There are five possible states of cluster 400. The five possible states of active-active cluster 400 are: state one: both nodes are active, (e.g., answering requests or serving customers or the like); state two: the first node has failed and control is being transferred to the other active node but the process is incomplete (node two has not yet assumed control of the first node's resource) so the requests to the first node's resources are not being answered; state three: transfer of control is complete and the second node is actively serving customers, the first node is not active; state four: before the first node is repaired and while the second node is active, the second node also fails so that no customers can be served; and state five: node one has been repaired, control of node one's resources is being returned to node one but the process is incomplete and node two is active.

After all the possible states are identified or as the possible states are identified, at step 704, the state space transition pattern is determined. In this step, the structure of the transitions between states (e.g., the edges in a directed graph) is determined. At step 705 the transition rates between states are determined (e.g., the weight of each edge in the directed graph). In one embodiment of the invention, this is done by Markov analysis and may be implemented internally as a directed graph. FIG. 6 is a Markov chain for active-active cluster 400. It should be understood that while the Markov chain depicted in FIG. 6 illustrates the transition pattern and associated transition rates between states, the actual generation of such a figure is not required by the invention.

In state 1 602 (active-active state), node 1 410 and node 2 412 are up and the cluster 400 is fully available. In state 2 604 (fail-over in progress), node 1 410 has failed or has been taken offline (i.e., is down), node 2 412 is up (in active mode), control of Data Resource 422 is being transferred to node 2 412. Cluster 400 is said to be 50% (or ½) available, assuming service is delivered to 50% of requests while the cluster is failing-over. In state 3 606 (active down state), node 1 410 is still down, node 2 412 is up and active and cluster 400 is 100% available. In state 4 608 (catastrophic failure state), both nodes 410 and 412 are down and the cluster 400 is not available. In state 5 node 1 410 has been repaired or is back online and control of Data Resource 1 422 has been returned to node 1 410. The cluster is 50% available.

The mean rate at which the system transitions from state 1 to state 2 is the mean rate at which node one fails (e.g., the mean rate of failure of node one may be one failure with one year) and is represented in FIG. 6 as $\alpha_1$ 610. The mean time it takes for node one to fail (mean time to failure while in active-active state) is the reciprocal of the mean rate of failure of node one or $1/\alpha_1$ and is called the Mean Time To Fail (MTTF) for node 1.

The mean rate at which the system transitions from state 2 to state 3 is the rate at which the fail-over process proceeds and is represented in FIG. 6 as $\gamma_1$ 612. The mean time it takes for the fail-over process to complete (mean time to fail-over to active-down state) is the reciprocal of the mean rate of fail-over from node 1 to node 2 or $1/\gamma_1$ and is called the Mean Time to Fail-Over (MTTF/O).

The mean rate at which the system transitions from state 3 to state 4 is the mean rate at which node two fails and is represented in FIG. 6 as $\alpha_2$ 614. The mean time it takes for node two to fail (mean time to failure while in active-down state) is the reciprocal of the mean rate at which node two fails or $1/\alpha_2$ and is called the Mean Time to Fail (MTTF) for node 2.

The mean rate at which the system transitions from state 4 back to state 3 is the mean rate to recover from catastrophic failure to active-down state and is represented in FIG. 6 as $\beta_2$ 616.

The mean rate at which the system transitions from state 3 to state 5 is the reciprocal of the mean time elapsed after entering the active-down state and before initiating fail-back and is represented in FIG. 6 as $\beta_1$ 618.

Finally, the mean rate at which the system transitions from state 5 to state 1 is the mean rate of fail-back and is represented in FIG. 6 as $\gamma_2$ 620. The mean time it takes to transfer control of Data Resource 1 422 from node two to node one (mean time to fail-back to active-active state) is the reciprocal of the mean rate of transfer of control from node 2 to node 1 or $1/\gamma_2$ and is called the Mean Time to Fail-Back (MTTF/B) for node 1.

In one embodiment of the invention, it is assumed that simultaneous failure of both active nodes 410 and 412 occurs with negligible probability, there is a negligible probability of failure of active node 412 while node 410 is failing-over and vice versa and that either node 410 or 412 will fail during fail-back. It is furthermore assumed that repair of failed node 410 or 412 is not attempted until the fail-over to the other node has occurred. If both nodes 410 and 412 have failed, it is assumed that each node is repaired serially and return to active-active mode from active-down mode requires failing-back. Finally, it is assumed to service is delivered to 50% of requests while cluster 400 is either failing over or back.

At step 706, the probability of being in a particular state is calculated. The probability distribution of cluster states for any system generally consist of both transient and steady-state components. In a transient situation, if $\pi_i(t)$ denotes the probability that the cluster is in state i at time t and the underlying stochastic process satisfies the Markov property, it can be shown that the state probability distribution $\pi(t) = (\pi_i(t))$ satisfies the differential equation of Kolmogorov:

$$\frac{d}{dt}\pi(t) = \pi(t) \cdot Q$$

where the infinitesimal generator matrix Q is defined by the directed graph and corresponding transition rates of the Markov chain. This equation admits a unique solution subject to initial condition $\pi(t=t_0)$ and normalization condition:

$$\sum_i \pi_i = 1$$

For a single node system with a two-dimensional state space consisting of a node "up" state and a node "down" state, the transient solution is given by:

$$\pi_1(t) = \frac{\beta}{\alpha+\beta} + \frac{\alpha}{\alpha+\beta} \cdot e^{-(\alpha+\beta)t}$$

$$\pi_2(t) = \frac{\alpha}{\alpha+\beta} - \frac{\alpha}{\alpha+\beta} \cdot e^{-(\alpha+\beta)t}$$

where $\pi_1$ and $\pi_2$ are the probabilities of the system being in the node "up" and node "down" states, respectively. Here $\alpha$ and $\beta$ denote the reciprocal mean times to failure and restore, respectively.

In a steady-state situation, since the Markov chains are finite ergodic (i.e., homogeneous and irreducible) chains, $\pi(t)$ converges to a unique steady state distribution $\pi$ as $t \to \infty$. The Kolmogorov differential equation reduces to:

$$\pi \cdot Q = 0$$

Thus, for a cluster with n states, the steady-state distribution is described by the solution of a (n+1)-dimensional linear system formed by this time-independent Kolmogorov equation and the normalization condition. For a single node system, given an error tolerance $\epsilon > 0$, the maximum norm of the error introduced by steady-state approximation is:

$$\|\pi(t) - \pi(\infty)\|_\infty < \epsilon$$

when $$t > \frac{1}{\alpha+\beta} \log \frac{\alpha}{(\alpha+\beta) \cdot \varepsilon}$$

So, for example, in the case that $1/\alpha = 1$ year and $1/\beta = 10$ minutes, the error introduced by steady-state approximation is less than $\epsilon = 10^{-5}$ when $t > 7$ minutes. Because the Markov chain is homogenous, the time spent in any given cluster state, called the sojourn time, is exponentially distributed. Therefore, the state transition rates are equal to the reciprocal of corresponding sojourn mean times. It is these transition rates which form the entries of the generator matrix Q.

The 2-node active-passive cluster is described by the matrix:

$$Q = \begin{pmatrix} -\alpha_1 & \alpha_1 & 0 & 0 \\ 0 & -\gamma_1 & \gamma_1 & 0 \\ \beta_1 & 0 & -(\alpha_2 + \beta_1) & \alpha_2 \\ 0 & 0 & \beta_2 & -\beta_2 \end{pmatrix}$$

The 2-node active-active cluster is described by the matrix:

$$Q = \begin{pmatrix} -\alpha_1 & \alpha_1 & 0 & 0 & 0 \\ 0 & -\gamma_1 & \gamma_1 & 0 & 0 \\ 0 & 0 & -(\alpha_2 + \beta_1) & \alpha_2 & \beta_1 \\ 0 & 0 & \beta_2 & -\beta_2 & 0 \\ \gamma_2 & 0 & 0 & 0 & -\gamma_2 \end{pmatrix}$$

For an active-passive cluster, in one embodiment of the invention, $\pi_1$ is the probability of being in state 1, $\pi_2$ is the probability of being in state 2, $\pi_3$ is the probability of being in state 3 and $\pi_4$ is the probability of being in state 4. Thus, the probability distribution is described by a 4-tuple, $\pi = (\pi_1, \pi_2, \pi_3, \pi_4)$ is given by:

$$\pi_1 = \left(1 + \frac{\alpha_1}{\beta_1} + \frac{\alpha_1}{\gamma_1} + \frac{\alpha_1\alpha_2}{\beta_1\beta_2}\right)^{-1}$$

$$\pi_2 = \left(1 + \frac{\gamma_1}{\alpha_1} + \frac{\gamma_1}{\beta_1} + \frac{\gamma_1\alpha_2}{\beta_1\beta_2}\right)^{-1}$$

$$\pi_3 = \left(1 + \frac{\beta_1}{\alpha_1} + \frac{\beta_1}{\gamma_1} + \frac{\alpha_2}{\beta_2}\right)^{-1}$$

$$\pi_4 = \left(1 + \frac{\beta_2}{\alpha_2} + \frac{\beta_1\beta_2}{\gamma_1\alpha_2} + \frac{\beta_1\beta_2}{\alpha_1\alpha_2}\right)^{-1}$$

where $\pi_i$ is the probability the cluster is in state i. Because in states 2 and 4, the system is not available (e.g., is not serving customers), the calculation of cluster availability is the sum of the probabilities that the system will be in either state 1 or state 3 or $\pi_1+\pi_3$.

For example, suppose the mean times are determined to be:

| Mean Times | |
| --- | --- |
| $1/\alpha_1$ | 1 year |
| $1/\alpha_2$ | 1 year |
| $1/\beta_1$ | 1 day |
| $1/\beta_2$ | 1 day |
| $1/\gamma_1$ | 1 minute |

Then the state probabilities are calculated to be:

| State | Probability |
| --- | --- |
| 1 | 0.99725840 |
| 2 | 0.00000190 |
| 3 | 0.00273221 |
| 4 | 0.00000749 |

Therefore, in this example, the availability is 0.99725840+ 0.00273221=0.99999062.

For an active-active cluster, in one embodiment of the invention, $\pi_1$ is the probability of being in state 1, $\pi_2$ is the probability of being in state 2, $\pi_3$ is the probability of being in state 3 $\pi_4$ is the probability of being in state 4 and $\pi_5$ is the probability of being in state 5. Thus, the probability distribution is described by a 5-tuple, $\pi=(\pi_1, \pi_2, \pi_3, \pi_4, \pi_5)$ is given by:

$$\pi_1 = \left(1 + \frac{\alpha_1}{\beta_1} + \frac{\alpha_1}{\gamma_1} + \frac{\alpha_1}{\gamma_2} + \frac{\alpha_1\alpha_2}{\beta_1\beta_2}\right)^{-1}$$

$$\pi_2 = \left(1 + \frac{\gamma_1}{\alpha_1} + \frac{\gamma_1}{\beta_1} + \frac{\gamma_1}{\gamma_2} + \frac{\alpha_2\gamma_1}{\beta_1\beta_2}\right)^{-1}$$

$$\pi_3 = \left(1 + \frac{\beta_1}{\alpha_1} + \frac{\beta_1}{\gamma_1} + \frac{\alpha_2}{\beta_2} + \frac{\beta_1}{\gamma_2}\right)^{-1}$$

$$\pi_4 = \left(1 + \frac{\beta_2}{\alpha_2} + \frac{\beta_1\beta_2}{\alpha_1\alpha_2} + \frac{\beta_1\beta_2}{\alpha_2\gamma_1} + \frac{\beta_1\beta_2}{\alpha_2\gamma_2}\right)^{-1}$$

$$\pi_5 = \left(1 + \frac{\gamma_2}{\alpha_1} + \frac{\gamma_2}{\beta_1} + \frac{\gamma_2}{\gamma_1} + \frac{\alpha_2\gamma_2}{\beta_1\beta_2}\right)^{-1}$$

where $\pi_i$ is the probability the cluster is in state i. The cluster availability is then given by:

$\pi_1+\pi_3+\frac{1}{2}(\pi_2+\pi_5)$

For example, suppose the mean times are determined to be:

| Mean Times | |
| --- | --- |
| $1/\alpha_1$ | 1 year |
| $1/\alpha_2$ | 6 months |
| $1/\beta_1$ | 1 day |
| $1/\beta_2$ | 1 day |
| $1/\gamma_1$ | 1 minute |
| $1/\gamma_2$ | 1 minute |

Then the state probabilities are calculated to be:

| State | Probability |
| --- | --- |
| 1 | 0.99724905 |
| 2 | 0.00000190 |
| 3 | 0.00273219 |
| 4 | 0.00001497 |
| 5 | 0.00000190 |

Therefore, in this example, the availability is 0.99724905+ 0.00273219+½(0.00000190+0.00000190) =0.99998313.

It should be understood that while specific examples for 2-node clusters have been detailed, the invention is not so limited and the availability of clusters containing any suitable number of nodes can be calculated.

For example, the state probability distribution for a single node system can be derived from the distribution for active-passive 2-node clusters by recognizing a special limiting case of the above-described metrics. More precisely, in the case of active-passive 2-node clusters, as $\gamma_1 \to \infty$ and $\alpha_2 \to 0$, $\pi_2 \to 0$ and $\pi_4 \to 0$, so the state space is reduced from four dimensions to two dimensions defined by "up" and "down" states. In particular, the probability a single node system is in an up state is given by:

$$\pi_1 = \left(1 + \frac{\alpha}{\beta}\right)^{-1}$$

and the probability a single node system is in a down state is given by:

$$\pi_3 = \left(1 + \frac{\beta}{\alpha}\right)^{-1}$$

where $\alpha=\alpha_1$ and $\beta=\beta_1$.

At step 708, the invention is used to predict availability as a function of any of the above described metrics. For example, the availability of a cluster may be predicted given particular values for MTTF, for MTTF/O, for MTTF/B, or for MTTR. For example, if the baseline values for MTTF for one and two node active-passive clusters are as follows:

how availability changes as a function of MTTF can be determined as follows, using the invention as described herein:

| Mean Times | | | |
|---|---|---|---|
| 1-node | | 2-nodes | |
| $1/\alpha$ | MTTF | $1/\alpha_1$ | MTTF |
| $1/\beta$ | 1 day | $1/\gamma_1$ | 1 minute |
| | | $1/\alpha_2$ | $\alpha_2 = \alpha_1$ |
| | | $1/\beta_1$ | 1 day |
| | | $1/\beta_2$ | 1 day |

| | Availability | |
|---|---|---|
| MTTF | 1-node | 2-nodes |
| 1 week | 0.87500000 | 0.98237236 |
| 1 month | 0.96816976 | 0.99893256 |
| 6 months | 0.99455041 | 0.99996636 |
| 1 year | 0.99726776 | 0.99999062 |
| 4 years | 0.99931554 | 0.99999906 |

Similarly, how availability changes as a function of MTTR can be determined from:

| Mean Times | | | |
|---|---|---|---|
| 1-node | | 2-nodes | |
| $1/\alpha$ | MTTF | $1/\alpha_1$ | MTTF |
| $1/\beta$ | 1 day | $1/\gamma_1$ | 1 minute |
| | | $1/\alpha_2$ | $\alpha_2 = \alpha_1$ |
| | | $1/\beta_1$ | 1 day |
| | | $1/\beta_2$ | 1 day | as:

| | Availability | |
|---|---|---|
| MTTF | 1-node | 2-nodes |
| 1 week | 0.87500000 | 0.98237236 |
| 1 month | 0.96816976 | 0.99893256 |
| 6 months | 0.99455041 | 0.99996636 |
| 1 year | 0.99726776 | 0.99999062 |
| 4 years | 0.99931554 | 0.99999906 |

In a stateless n-node cluster, incoming client requests may be uniformly distributed among servers by a load balancing mechanism. If a server in the cluster fails, the failed server may be "black-listed" from request distribution after the failure is detected and the load balancing algorithm may be updated. During this delay, a proportional fraction of requests continue to be sent to the failed server. Node failures may be detected through mutual exchange of heartbeat messages. Network load balancing may increase availability of front-end applications which do not maintain permanent state in storage devices. Examples of such applications include but are not limited to MICROSOFT INTERNET INFORMATION SERVER (IIS) and proxy services.

Network load balancing may support load balanced distribution of TCP/IP traffic in clusters containing, for example, up to 32 hosts. All clustered hosts may include an instance of network load balancing and periodically exchange multi-cast or broadcast messages to communicate status. If the heartbeat message from a given host is not received after a configurable number of exchanges, then that host is considered failed and "convergence" may be initiated. Requests continue to be sent to the failed host during convergence until the load balancing algorithm is updated to redistribute traffic among remaining available hosts.

The heartbeat interval may be configurable with a default (e.g., 1 second). The number of missed heartbeats required to initiate convergence may also be configurable with a default (e.g., 5). These parameters typically will determine the delay in failure detection. Additional failover delay is imposed by the convergence process itself which may occur, for example, in less than 10 seconds.

Referring again to FIG. 7, at step 702 all the possible state spaces of a stateless n-node cluster are identified. For simplicity, the example given will discuss a 2-node stateless cluster, but it should be understood that the invention includes within its scope the determination of availability for one or more clusters containing any number of nodes. In a stateless 2-node cluster, there are four possible state spaces. The four possible state spaces of a stateless 2-node cluster are; state space one: two nodes are active, (e.g., serving customers) and there is full availability (i.e., availability=1); state space 2: a fail-over to an active node is in progress (fail-over in this scenario generally means that the node which has failed is pending black-list updating by the load balancer) and there is half-availability (i.e., availability=½); state space 3: one node is active and there is full availability (i.e., availability=1).

Figure 8:
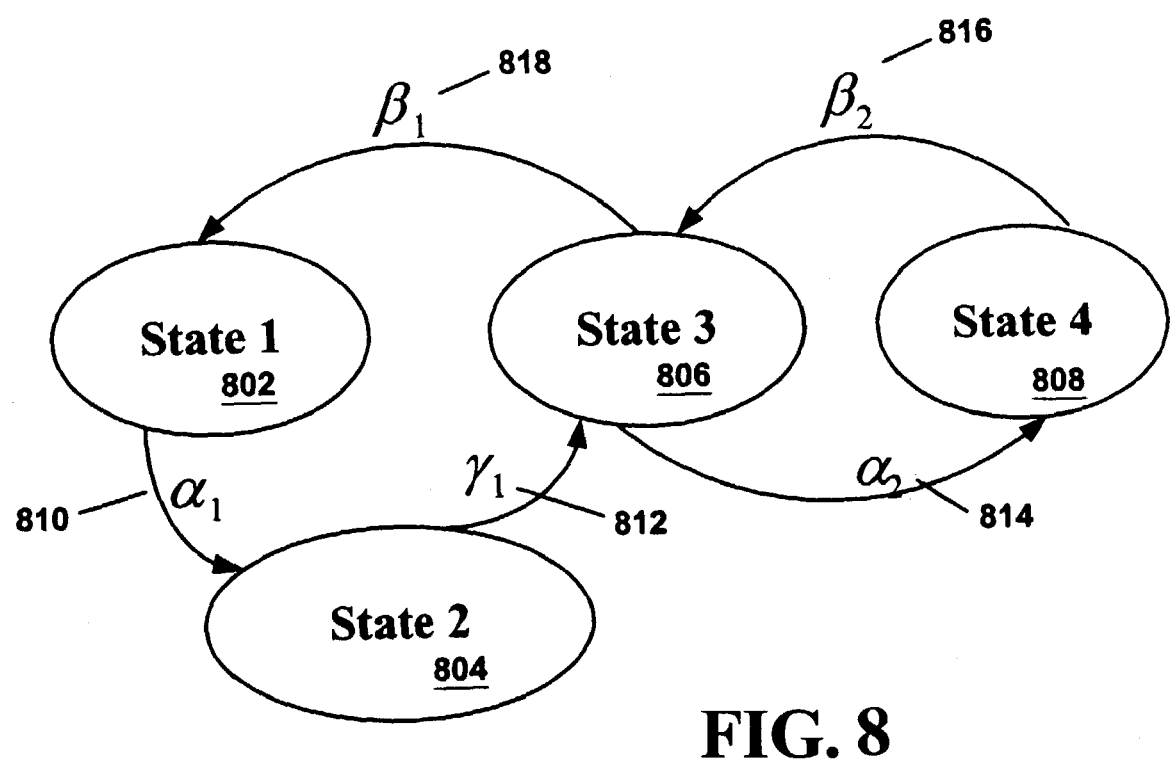
FIG. 8 is a Markov chain of an exemplary two-node stateless cluster.

After all the possible states are identified (i.e., after the state space is determined), at step 704, the structure of the transitions between the states are mapped and at step 705 the transition rates between states are determined. In one embodiment of the invention, a Markov analysis is applied to the stateless 2-node cluster to calculate system availability. FIG. 8 is a Markov chain, as illustrated in FIG. 8 for a stateless 2-node. It should be understood that while the Markov chain depicted in FIG. 8 illustrates the transitions and transition rates between states, the actual generation of such a figure is not required by the invention.

In state 1 802 (2 nodes active), nodes 1 and 2 are up and the cluster is available. In state 2 804, fail-over to the other active node is in progress and the cluster is ½ available, one of the nodes has failed or has been taken offline (i.e., is down), the other node is up and active and the cluster is ½ available. In state 3 806 one node is active, one node is down, and the cluster is available. In state 4 no nodes are active (catastrophic failure state), both nodes are down and the cluster is not available.

The mean rate at which the system transitions from state 1 to state 2 is the mean rate at which one of the nodes fails and is represented in FIG. 8 as $\alpha_1$ 810. The mean time it takes for one of the two nodes to fail (mean time to failure if 2 nodes are active) is the reciprocal of the mean rate of failure of one of the nodes or $1/\alpha_1$ and is called the Mean Time To Fail (MTTF) if 2 nodes are active.

The mean rate at which the system transitions from state 2 to state 3 is the rate at which the first failed node is black-listed and is represented in FIG. 8 as $\gamma_1$ 812. The mean time it takes for the black-listing process to complete (mean time to black-list the first failed node) is the reciprocal of the mean rate at which the first failed node is black-listed or $1/\gamma_1$ and is called the Mean Time to Black-List the first failed node. (MTTBL).

The mean rate at which the system transitions from state 3 to state 4 is the mean rate at which a node fails if one node is active and is represented in FIG. 8 as $\alpha_2$ 814. The mean time it takes for a node to fail if one node is active (mean time to failure if 1 node is active) is the reciprocal of the mean rate at a node fails if one node is active or $1/\alpha_2$ and is called the Mean Time to Fail (MTTF) if one node is active.

The mean rate at which the system transitions from state 4 back to state 3 is the mean rate of repair of the second failed node and is represented in FIG. 8 as $\beta_2$ 816. The mean time it takes to repair the second failed node (mean time to repair second failed node) is the reciprocal of the mean rate of repair of the second failed node or $1/\beta_2$ and is called the Mean Time to Repair or Restore (MTTR) the second failed node.

Finally, the mean rate at which the system transitions from state 3 to state 1 is the mean rate of repair of the first failed node and is represented in FIG. 8 as $\beta_1$ 818. The mean time it takes to repair the first failed node (mean time to repair first failed node) is the reciprocal of the mean rate of repair of the first failed node or $1/\beta_1$ and is called the Mean Time to Repair or Restore (MTTR) the first failed node.

In one embodiment of the invention, it is assumed that simultaneous failure of more than one active node occurs with negligible probability, and that there is a negligible probability of failure of the remaining active node during fail-over. It is furthermore assumed that requests are uniformly distributed among the nodes which are active or failing over and that repair of a failed node occurs without interruption in service.

The cluster availability of the stateless 2-node cluster is: $\pi_1+\pi_3+\frac{1}{2}(\pi_2)$ where each of these state probabilities is given by the state probabilities as derived for active-passive 2-node clusters above. For example, if the mean times are determined to be:

| Mean Times | |
|---|---|
| $1/\alpha_1$ | 1 month |
| $1/\alpha_2$ | 2 weeks |
| $1/\beta_1$ | 1 hour |
| $1/\beta_2$ | 1 hour |
| $1/\gamma_1$ | 15 seconds | and the state probabilities are calculated to be:

| State | Probability |
|---|---|
| 1 | 0.99860342 |
| 2 | 0.00000385 |
| 3 | 0.00138695 |
| 4 | 0.00000385 |

Therefore in this example, the availability of a stateless 2-node cluster is 0.99860534+0.00138695+½*0.00000385=0.99999326.

In an Internet service topology formed by groups of clustered and single server components (e.g., web and database servers) where each group performs the same function, the successful completion of requests from the Internet require the availability of some subset of these component groups. If a given component group consists of more than one server, then failure of a single server within the component group will often result in only a short interruption in service.

For example, suppose an Internet service consists of n component groups denoted $\{C_i\}_{i=1}^n$ and the availability of each component group $C_i$ is $A_i$. If an Internet request requires the availability of a subset of component groups $\{C_j\}_{j \in S}$ where $S \subseteq \{1, \ldots, n\}$, then the availability of the Internet service with respect to that request is given by the product of these component group availabilities:

$$\prod_{i \in S} A_i$$

Here S is the index set associated with the required subset of component groups.

The availability of a simple Microsoft Commerce Server deployment as shown in FIG. 1b can be determined using this methodology. The availability determined above for a stateless 2-node cluster and that of a 2-node active-passive cluster is used, i.e., the availability of the commerce server is 0.99999326*0.99999062=0.99998388. This value represents the overall availability for the deployment.

The above described system and method may be used as a design tool or operations tool. For example, suppose a particular enterprise or business entity wants to provide "five nines" availability of a system for their customers. An analysis that is run on the current system may return the result that only "three nines" availability is presently available. The above described system and method may be used to determine the most optimal way of altering the system to provide "five nines" availability. By mathematically altering the parameters and determining the corresponding change in availability, the most cost effective way to reach "five nines" availability can be determined. For example, by changing one of the parameters (MTTF, MTTF/O, MTTR, or MTTF/B) and correlating the cost to realize the change with the change in availability, the most effective or cost-efficient way to reach the desired availability estimate can be determined. By putting the desired availability into the availability equation and solving for MTTF, for example, it can be determined what the mean time for failure must be in order to reach the desired availability, and so on.

MTTR can be improved by specific engineering practices within an Information Technology department such as by choosing a faster backup mechanism for the database. MTTF/O can be minimized by reducing the number of retries or decreasing the time between heartbeat checks. The aforementioned changes may be more proactively implemented than requiring an increased MTTF. Thus the Markov model as described in the context of the present invention can generate tangible increases in availability by performing a change to a much less complex system than the entire database server or application.

CONCLUSION

It is noted that the foregoing examples have been provided merely for the purpose of explanation and are in no way to be construed as limiting of the present invention. While the invention has been described with reference to preferred embodiments, it is understood that the words used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method for determining the availability of a cluster of computing devices, the method comprising:
identifying a plurality of states comprising a state space of the cluster;
determining a state space transition pattern between states in the state space;
generating a transition matrix by determining transition rates between states according to the state space transition pattern; and
determining availability of the cluster by applying Kolmogorov s equation to the transition matrix to determine a system of equations for calculating state probabilities for states in the cluster.

2. The method of claim 1, wherein determining availability of the cluster further comprises summing the calculated state probabilities associated with available states.

3. The method of claim 1, wherein the plurality of states comprises a first state and a second state and determining the state space transition pattern comprises determining that a first transition from the first state to the second state is possible.

4. The method of claim 3, wherein generating a transition matrix comprises determining a first transition rate associated with the first transition from the first state to the second state.

5. The method of claim 4, wherein the first transition rate comprises the reciprocal of mean time to fail, mean time to fail-over, mean time to fail-back or mean time to recover.

6. The method of claim 4, wherein the first transition rate is determined by measuring mean time to fail, mean time to fail-over, mean time to fail-back or mean time to recover.

7. The method of claim 4, wherein the first transition rate is measured manually.

8. The method of claim 4, wherein the first transition rate is measured by a performance monitoring feature of an operating system.

9. The method of claim 8, wherein the performance monitoring feature of the operating system is Perfmon.

10. The method of claim 1, wherein the plurality of states includes at least one state in which the cluster is unavailable for service.

11. The method of claim 1, wherein the plurality of states includes at least one state in which the cluster is available for service.

12. The method of claim 1, wherein the state space includes all possible states of the cluster.

13. The method of claim 1, wherein the cluster includes at least one passive node.

14. The method of claim 1, wherein the cluster includes at least two active nodes.

15. The method of claim 1, wherein the cluster is a stateless cluster.

16. The method of claim 1, wherein determining a state space transition pattern between states in the state spaces comprises performing a Markov analysis of the plurality of states of the cluster.

17. The method of claim 1, wherein the cluster is an active-passive cluster.

18. The method of claim 1, wherein the cluster is an active-active cluster.

19. The method of claim 1, wherein the cluster comprises a two-node MICROSOFT WINDOWS cluster.

20. A tool for determining the availability of a cluster, the tool comprising:
means for identifying states in a state space of a cluster;
means for determining a transition pattern between the states in the state space; and
means for determining a matrix of transition rates between states in the state space according to the transition pattern;
means for determining availability of the cluster by applying Kolmogorov s equation to the matrix to generate a set of equations calculating the probabilities of states in which the cluster is available.

21. The tool of claim 20, wherein the tool is used to determine an efficient means to achieve a target availability by varying at least one of the transition rates.

* * * * *